(12) United States Patent
Morita et al.

(10) Patent No.: US 11,429,015 B2
(45) Date of Patent: Aug. 30, 2022

(54) LIGHT-EMITTING ELEMENT, LIGHT SOURCE DEVICE AND PROJECTOR

(71) Applicant: SONY CORPORATION, Tokyo (JP)

(72) Inventors: Hiroki Morita, Tokyo (JP); Izushi Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/976,377

(22) PCT Filed: Jan. 17, 2019

(86) PCT No.: PCT/JP2019/001270
§ 371 (c)(1),
(2) Date: Aug. 27, 2020

(87) PCT Pub. No.: WO2019/171775
PCT Pub. Date: Sep. 12, 2019

(65) Prior Publication Data
US 2021/0116795 A1    Apr. 22, 2021

(30) Foreign Application Priority Data
Mar. 6, 2018 (JP) .............................. JP2018-040131

(51) Int. Cl.
*G03B 21/20* (2006.01)
(52) U.S. Cl.
CPC ....... *G03B 21/204* (2013.01); *G03B 21/2066* (2013.01)
(58) Field of Classification Search
CPC ..... F21S 2/00; F21V 9/30; G02B 5/02; G02B 5/0242; G02B 5/0247; G02B 5/08;
(Continued)

(56) References Cited

U.S. PATENT DOCUMENTS

| | | | |
|---|---|---|---|
| 5,469,278 A * | 11/1995 | Takahara | H04N 9/312 349/86 |
| 11,025,175 B1 * | 6/2021 | Landig | G02B 27/0176 |
| 2003/0094626 A1 * | 5/2003 | Duggal | B82Y 20/00 257/184 |

(Continued)

FOREIGN PATENT DOCUMENTS

| | | |
|---|---|---|
| JP | 2012-199075 | 10/2012 |
| JP | 2012-247625 | 12/2012 |

(Continued)

OTHER PUBLICATIONS

International Search Report prepared by the Japan Patent Office dated Mar. 1, 2019, for International Application No. PCT/JP2019/001270.

(Continued)

*Primary Examiner* — Magda Cruz
(74) *Attorney, Agent, or Firm* — Sheridan Ross P.C.

(57) ABSTRACT

An object is to provide a light-emitting element capable of further suppressing the spread of a light-emitting region and further improving directivity. A light-emitting element is provided which includes at least a phosphor layer and an emission angle selection layer which emits light incident at a predetermined angle, in which the phosphor layer includes a phosphor and a light scatterer, and the phosphor layer and the light emission angle selection layer are arranged in this order.

14 Claims, 9 Drawing Sheets

(58) Field of Classification Search
CPC .... G02B 5/20; G03B 21/2006; G03B 21/204; G03B 21/2066

See application file for complete search history.

(56) References Cited

U.S. PATENT DOCUMENTS

| | | | |
|---|---|---|---|
| 2006/0291226 A1* | 12/2006 | Daicho | B82Y 20/00 362/509 |
| 2008/0303981 A1* | 12/2008 | Fryer | G02F 1/133603 349/69 |
| 2010/0225229 A1* | 9/2010 | Hosoda | H01L 51/5268 313/504 |
| 2014/0185299 A1 | 7/2014 | Sanga et al. | |
| 2015/0301282 A1 | 10/2015 | Natsumeda et al. | |
| 2016/0046857 A1 | 2/2016 | Inoue et al. | |
| 2016/0265749 A1* | 9/2016 | Inada | G03B 21/204 |
| 2017/0219172 A1 | 8/2017 | Inoue et al. | |
| 2018/0040786 A1* | 2/2018 | Chen | H01L 33/505 |
| 2019/0072245 A1* | 3/2019 | Kobayashi | F21S 2/005 |
| 2019/0079376 A1* | 3/2019 | Itoh | G02B 27/141 |

FOREIGN PATENT DOCUMENTS

| | | | | |
|---|---|---|---|---|
| JP | 2013-168658 | 8/2013 | | |
| JP | 2014-153527 | 8/2014 | | |
| JP | 2016018010 A | * 2/2016 | ............ | G03B 21/00 |
| JP | 2016-058213 | 4/2016 | | |
| JP | 2016-061852 | 4/2016 | | |
| JP | 2016-171228 | 9/2016 | | |
| JP | 2017-157488 | 9/2017 | | |
| WO | WO 2012/049905 | 4/2012 | | |
| WO | WO 2012/137583 | 10/2012 | | |
| WO | WO 2013/103039 | 7/2013 | | |
| WO | WO 2016/121721 | 8/2016 | | |
| WO | WO 2017/169628 | 10/2017 | | |

OTHER PUBLICATIONS

Official Action for China Patent Application No. 201980016125.4, dated Mar. 18, 2022, 5 pages.

* cited by examiner

LIGHT-EMITTING ELEMENT, LIGHT SOURCE DEVICE AND PROJECTOR

CROSS REFERENCE TO RELATED APPLICATIONS

This application is a national stage application under 35 U.S.C. 371 and claims the benefit of PCT Application No. PCT/JP2019/001270 having an international filing date of 17 Jan. 2019, which designated the United States, which PCT application claimed the benefit of Japanese Patent Application No. 2018-040131 filed 6 Mar. 2018, the entire disclosures of each of which are incorporated herein by reference.

TECHNICAL FIELD

The present technology relates to a light-emitting element, a light source device, and a projector.

BACKGROUND ART

In recent years, there is a need for light emission performed in a necessary direction with efficiency in a variety of applications of optical devices such as lighting fixtures, displays, and projectors.

For example, an optical device is proposed which includes a plurality of nanostructures containing metal and formed in a two-dimensional periodic array, and a wavelength conversion layer which emits light having a wavelength different from that of excitation light, and in the nanostructures, a length in a predetermined first direction parallel to an incident surface on which excitation light is incident (for example, long side length), and a length in a second direction parallel to the incident surface and perpendicular to the first direction (short side length) is different from each other (see Patent Document 1).

Furthermore, for example, a light-emitting element is proposed which includes a photoluminescent layer, a light-transmitting layer, and a periodic structure, in which the periodic structure includes at least one of a plurality of protrusions or a plurality of recesses, light emitted by the photoluminescent layer includes first light having a wavelength in air of $\lambda_a$, a relationship of $\lambda_a/n_{wav-a} < D_{int} < \lambda_a$ holds in which $D_{int}$ denotes a distance between adjacent protrusions or recesses, and $n_{wav-a}$ denotes the refractive index of the photoluminescent layer for the first light, and a wavelength A at which the intensity is at its peak in the spectrum of ht emitted in a direction perpendicular to the photoluminescent layer via the periodic structure deviates from a wavelength B at which the intensity is at its peak in the light emission spectrum of a photoluminescent material contained in the photoluminescent layer (see Patent Document 2).

Moreover, for example, an optical device is proposed which includes a phosphor layer which causes fluorescence to occur with incident light, a plasmon excitation layer which excites first surface plasmons with the fluorescence, the phosphor layer and the plasmon excitation layer being laminated in that order, and an exit section which emits the first surface plasmons or light which occurs on a surface of the plasmon excitation layer, the surface being opposite to a surface in contact with the phosphor layer, to the outside as emitting light, in which the phosphor layer contains fine metal particles which excite second surface plasmons with the incident light (see Patent Document 3).

CITATION LIST

Patent Document

Patent Document 1: Japanese Patent Application Laid-Open No. 2017-157488
Patent Document 2: Japanese Patent Application. Laid-Open No. 2016-171228
Patent Document 3: WO2012/049905

SUMMARY OF THE INVENTION

Problems to be Solved by the Invention

However, the technology proposed in each of Patent Documents 1 to 3 may not be able to further suppress the spread of a light-emitting region and to further improve directivity.

Therefore, the present technology has been made in view of such a situation, and a main object thereof is to provide a light-emitting element capable of further suppressing the spread of a light-emitting region and further improving directivity, as well as a light source device and a projector including the light-emitting element.

Solutions to Problems

As a result of intensive research to achieve the above-described object, the present inventors have surprisingly succeeded in achieving further suppression of the spread of a light-emitting region and further improvement of the directivity, and have completed the present technology.

That is, in the present technology, first, a light-emitting element is provided which includes at least a phosphor layer and an emission angle selection layer that emits light incident at a predetermined angle, in which the phosphor layer includes a phosphor and a light scatterer, and the phosphor layer and the light emission angle selection layer are arranged in this order.

The light-emitting element according to the present technology further includes a reflective layer, and
in the light-emitting element according to the present technology, the reflective layer, the phosphor layer, and the light emission angle selection layer may be arranged in this order.

The light-emitting element according to the present technology further includes a dielectric spacer, and
in the light-emitting element according to the present technology, the dielectric spacer may be arranged between the reflective layer and the phosphor layer, and moreover, the dielectric spacer may have a dielectric constant of 2.5 to 6.0 and may have a thickness of 10 nm to 400 nm in a region with a wavelength of 380 nm to 780 nm.

In the light-emitting element according to the present technology, the phosphor layer further includes metal nanoparticles, and
the metal nanoparticles may be arranged on a surface of the phosphor.

The light-emitting element according to the present technology further includes a reflective layer, the reflective layer, the phosphor layer, and the light emission angle selection layer are arranged in this order, the phosphor layer further includes metal nanoparticles, and the metal nanoparticles may be arranged on the surface of the phosphor.

The light-emitting element according to the present technology further includes a reflective layer and a dielectric spacer, the reflective layer, the dielectric spacer, the phosphor layer, and the light emission angle selection layer may be arranged in this order, and the phosphor layer may further include metal nanoparticles, the metal nanoparticles may be arranged on the surface of the phosphor, and moreover, the dielectric spacer may have a dielectric constant of 2.5 to 6.0 and may have a thickness of 10 nm to 400 nm in a region with a wavelength of 380 nm to 780 nm.

In the light-emitting element according to the present technology, the phosphor may include a low reabsorption phosphor.

In the light-emitting element according to the present technology, the emission angle selection layer may include a dielectric film.

In the light-emitting element according to the present technology, the emission angle selection layer may have a grating structure or a patch structure.

In the light-emitting element according to the present technology, the light scatterer may include a light-scattering reflector, scattering particles, or a void.

Furthermore, the present technology provides a light source device including the light-emitting element according to the present technology, a light source that emits excitation light, and a moving mechanism that moves a position of the light-emitting element irradiated with the excitation light over time.

Moreover, the present technology provides a projector including the light source device according to the present technology, an image generation unit that generates an image using light emitted from the light source device, and a projection unit that projects an image generated by the image generation unit.

Effects of the Invention

According to the present technology, it is possible to further suppress the spread of a light-emitting region and to further improve directivity. Note that the effects described herein are not necessarily limited, and may be any of the effects described in the present disclosure.

MODE FOR CARRYING OUT THE INVENTION

Figure 1:
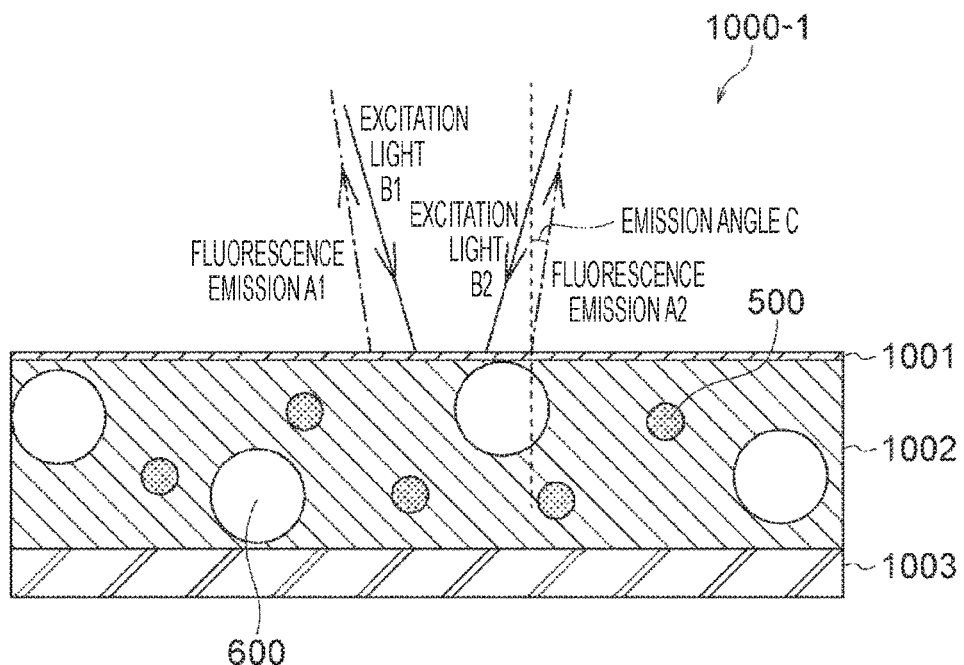
FIG. 1 is a cross-sectional view illustrating an example configuration of a light-emitting element of a first embodiment to which the present technology is applied.

Hereinafter, preferred embodiments for carrying out the present technology will be described. The embodiments described below each indicate an example of a typical embodiment of the present technology, and the scope of the present disclosure should not be construed narrowly by the embodiments. Note that in descriptions using the drawings, the same or equivalent elements or members will be denoted by the same reference numerals, and redundant descriptions thereof will be omitted.

Note that the description will be given in the following order.

1. Overview of Present Technology
2. First Embodiment (Example 1 of Light-emitting Element)
3. Second Embodiment (Example 2 of Light-emitting Element)
4. Third Embodiment (Example 3 of Light-emitting Element)
5. Fourth. Embodiment (Example 4 of Light-emitting Element)
6. Fifth Embodiment (Example 5 of Light-emitting Element)
7. Sixth Embodiment (Example 6 of Light-emitting Element)
8. Seventh Embodiment (Example of Light Source Device)
9. Eighth. Embodiment (Example of Projector)

1. Overview of Present Technology

First, an overview of the present technology will be described.

The present technology relates to a light-emitting element, a light source device, and a projector.

In a phosphor light source, the efficiency of coupling between a light source and an optical system to be coupled thereto may decrease due to the spread of a light-emitting region inside a phosphor layer and the spread of a divergence angle of emitted fluorescence. There is an example in which a divergence angle of emitted fluorescence is suppressed by using a diffractive structure in a phosphor light source, but there exists a constraint that only the divergence angle in one or two vertical planes can be controlled with respect to an emission plane. However, in that example, a measure for suppressing the spread of a light-emitting region is not applied. Furthermore, there is an example in which fluorescence emission is enhanced by surface plasmon resonance of metal nanoparticles and a bulk medium. However, the metal nanoparticles and the bulk medium are not used in an environment where excitation light is multiply reflected, and thus excitation efficiency remains low.

The present technology can reduce etendue (=size of light-emitting region×exit divergence angle). Moreover, the present technology can minimize reduction in the amount of light emission.

Etendue can be reduced by combining the following techniques A and B:

A. the spread of a fluorescence emission region in a phosphor layer is suppressed by a scattering structure (suppression of the spread of a light-emitting region), B. an emission angle-dependent emission angle selection layer (for example, a dielectric film) allows only fluorescence with a small emission angle to be emitted, and fluorescence incident on the emission angle selection layer (dielectric film) from a phosphor layer side at an angle larger than a critical angle is reflected and repeatedly scattered inside the layer until the fluorescence is incident at an angle smaller than the critical angle (improvement of directivity).

Furthermore, the amount of fluorescence emission may be reduced due to reabsorption of the phosphor caused by multiple reflection of fluorescence inside the phosphor layer, which may increase a temperature of the phosphor. In order to improve the reduction in the amount of fluorescence emission and the increase in the temperature of the phosphor, a fluorescence emission characteristic and a temperature characteristic can be improved by the following technique C:

C. a phosphor with a low reabsorption rate is used (improvement of emission decay due to reabsorption of the phosphor).

Moreover, the present technology can improve heat dissipation performance by temporally mitigate a temperature of a portion irradiated with excitation light when the phosphor layer is formed on a circular substrate and is rotationally driven for use.

The present technology can reduce etendue (=size of light-emitting region×exit divergence angle) and can further minimize the reduction in the amount of light emission, and thus can be suitably applied to light sources for projectors, transmissive spatial modulator panels, spot lighting, automotive headlights, windows, and the like.

2. First Embodiment (Example 1 of Light-Emitting Element)

A light-emitting element of a first embodiment (example 1 of light-emitting element) according to the present technology is a light-emitting element which includes at least a phosphor layer and an emission angle selection layer which emits light incident at a predetermined angle, in which the phosphor layer includes a phosphor and a light scatterer, and the phosphor layer and the light emission angle selection layer are arranged in this order. Here, the light incident at a predetermined angle means that the light is incident on the emission angle selection layer from a phosphor layer side through a surface of the phosphor layer at an angle equal to or smaller than a critical angle. Note that when light is incident on the emission angle selection layer at an angle equal to or smaller than the critical angle, the emission angle selection layer emits the light, and when light is incident on the emission angle selection layer at an angle larger than the critical angle, the light is repeatedly scattered inside the phosphor layer until the light is incident on the emission angle selection layer at an angle equal to or smaller than the critical angle.

The light-emitting element of the first embodiment according to the present technology may further include a reflective layer, and in such a case, the reflective layer, the phosphor layer, and the light emission angle selection layer are arranged in this order in the light-emitting element of the first embodiment according to the present technology.

According to the light-emitting element of the first embodiment according to the present technology, etendue can be reduced. Furthermore, as described later, in a case where a low reabsorption phosphor is used for the phosphor layer, the light-emitting element of the first embodiment according to the present technology can be further improved in emission decay.

FIG. 1 illustrates a light-emitting element 1000 (which is a light-emitting element 1000-1 in FIG. 1) as an example of the light-emitting element of the first embodiment according to the present technology. FIG. 1 is a cross-sectional view of the light-emitting element 1000-1.

The light-emitting element 1000-1 includes a phosphor layer 1002, an emission angle selection layer 1001, and a reflective layer 1003, and the reflective layer 1003, the phosphor layer 1002, and the emission angle selection layer 1001 are arranged in this order. As illustrated in FIG. 1, a surface of the light-emitting element 1000-1 on a side of incident light (excitation light B1 and B2) and emission light (fluorescence emission A1 and A2) serves as the emission angle selection layer 1001. The phosphor layer 1002 includes a phosphor 500 and a light scatterer 600. An emission angle C of the emission light (fluorescence emission A1 and A2) can be reduced by the emission angle selection layer 1001.

In the light-emitting element 1000-1, the phosphor layer 1002 is held on the reflective layer 1003 (for example, a mirror substrate) so as to have any thickness, and the emission angle selection layer 1001 is arranged on the surface of the phosphor layer 1002 on a side of the incident light (excitation light B1 and B2) and the emission light (fluorescence emission A1 and A2). The emission angle selection layer 1001 may include, but not particularly limited to, a dielectric film (for example, a thin multilayer film including a dielectric material).

The phosphor 500 may include, for example, at least one material selected from an organic material, an inorganic material, a YAG-based material, ZnS, ZnSe, CdS, and CdSe as a constituent material. The phosphor 500 preferably includes a low reabsorption phosphor. By including the low reabsorption phosphor, emission decay can be improved. The emission half width of the phosphor 500 may be, but not particularly limited to, 130 nm or less. Furthermore, the phosphor 500 is, for example, phosphor particles. In a case of phosphor particles, for example, in a case of quantum dots, an average particle diameter thereof is not particularly limited, but is preferably 2 nm to 10 nm, and furthermore, in a case of a Ce:YAG phosphor, an average particle diameter thereof is not particularly limited, but is preferably 1 to 50 µm. The concentration of the phosphor 500 (for example, phosphor particles) in the phosphor layer 1002 is not particularly limited, neither. However, for example, in a case of the quantum dots, the concentration is preferably 2 to 34 vol %, and for example, in a case of the Ce:YAG phosphor, the concentration is preferably 40 to 70 vol %.

The light scatterer 600 may be scattering particles, the scattering particles may include, as a constituent material, at least one of a silica-based material or an oxide material, and the concentration of the light scatterer 600 (for example, scattering particles) in the phosphor layer 1002 is not particularly limited, but is preferably 0.5 vol % or higher. Furthermore, the light scatterer 600 may be a void. The light scatterer 600 can suppress the spread of the fluorescence emission region in the phosphor layer 1002.

The reflective layer 1003 may be a mirror substrate, may include at least one of a dielectric material or a metal material as a constituent material, and preferably has a reflectance of 80% or more in a region with a wavelength of 380 to 780 nm. The overlapping rate of an absorption spectrum and an emission spectrum is not particularly limited, but is preferably small, and for example, the overlapping rate may be 10% or less.

Figure 2:
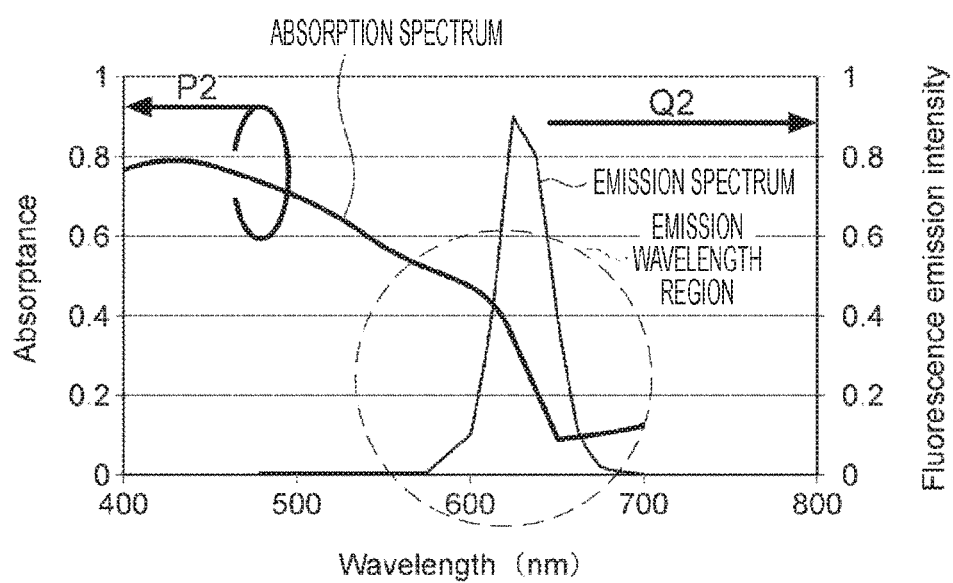
FIG. 2 is a graph illustrating an example of a relationship between an absorption spectrum and an emission spectrum of a phosphor.

FIG. 2 illustrates a relationship between an absorption spectrum and an emission spectrum of a phosphor. In the graph in FIG. 2, vertical axes represent absorptance (a vertical axis indicated by arrow P2 in FIG. 2) and fluorescence emission intensity (a vertical axis indicated by arrow Q2 in FIG. 2), and the horizontal axis represents wavelength. Referring to FIG. 2, it is possible to confirm the existence of a wavelength region in which the absorption spectrum and the emission spectrum overlap, and it is understood that the absorptance in the emission wavelength region is high.

Figure 3:
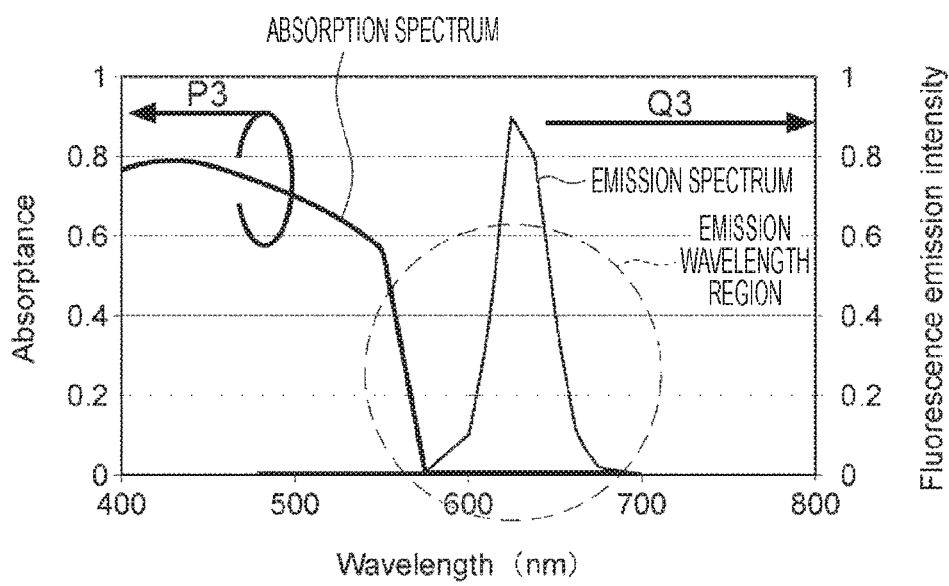
FIG. 3 is a graph illustrating an example of a relationship between an absorption spectrum and an emission spectrum of a phosphor.

FIG. 3 illustrates a relationship between an absorption spectrum and an emission spectrum of a low reabsorption phosphor. In the graph in FIG. 3, vertical axes represent absorptance (a vertical axis indicated by arrow P3 in FIG. 3) and fluorescence emission intensity (a vertical axis indicated by arrow Q3 in FIG. 3), and the horizontal axis represents wavelength. Referring to FIG. 3, it is possible to confirm that there is almost no wavelength region where the absorption spectrum and the emission spectrum overlap, and it is understood that the absorptance in the emission wavelength region is low.

Figure 11:
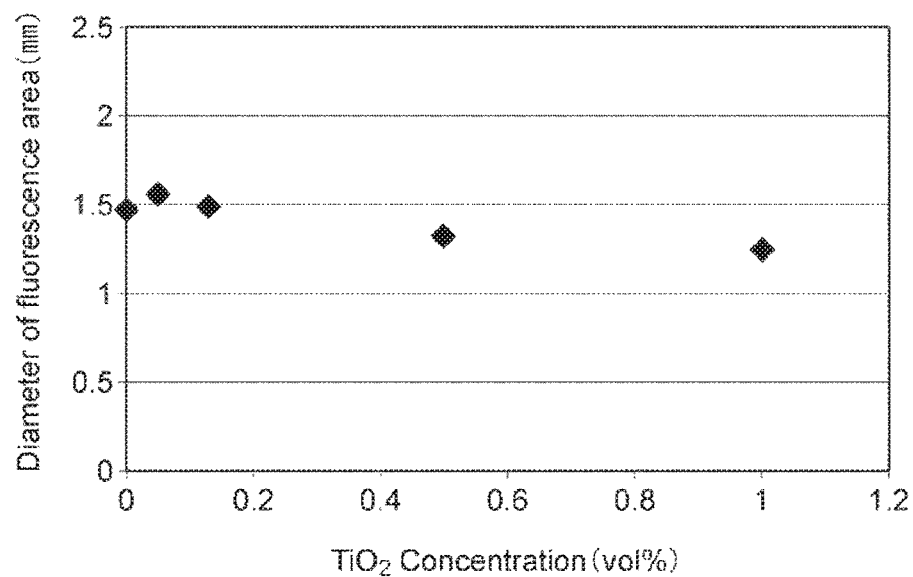
FIG. 11 is a graph illustrating the dependence of the diameter of a fluorescence area on the concentration of $TiO_2$ scattering particles.

FIG. 11 illustrates a graph of a result of optical simulation 1 of the diameter of a fluorescence area with respect to the volume concentration of scattering particles ($TiO_2$) having a particle diameter of 1.0 μm which cause Mie scattering. Note that the scattering particles having a particle diameter of 1.0 μm were used in optical simulation 1, but the particle diameter of scattering particles is not particularly limited as long as Mie scattering is caused by scattering particles having such a particle diameter. In the graph in FIG. 11, the vertical axis represents the diameter of fluorescence area (mm), and the horizontal axis represents $TiO_2$ concentration (vol %).

The contents of optical simulation 1 will be described in detail below.

(Purpose)

The influence of the concentration of $TiO_2$ particles contained in the phosphor layer on the size of the light-emitting region was checked.

(Method of Calculation)

The diameter of a light-emitting circular region on the surface of the phosphor layer was calculated while changing the concentration of $TiO_2$ particles inside the phosphor.

(Result)

It was confirmed that the higher the $TiO_2$ particle concentration, the smaller a light-emitting size. That is, when the concentration becomes 0.5 vol % or higher, the size of the fluorescence area becomes small, and the diameter of the area becomes φ1.32 mm. It was confirmed that the size of the fluorescence area could be reduced by 10% as compared with a state where no scattering particles were added.

Figure 12:
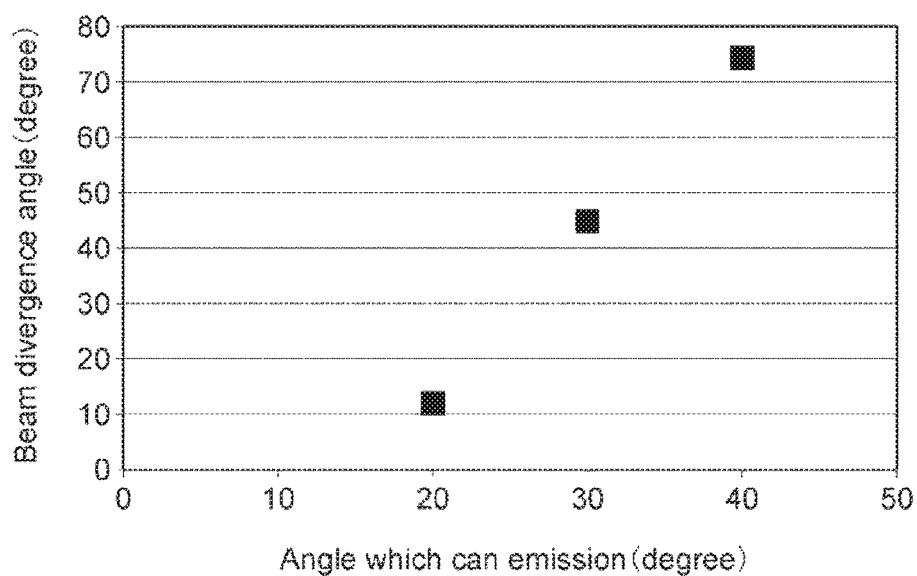
FIG. 12 is a graph illustrating the dependence of a beam divergence angle on a critical angle of a dielectric film.

Moreover, FIG. 12 illustrates a result of optical simulation 2 of the dependence of fluorescent emission light on the critical angle of the dielectric film (emission angle selection layer). In optical simulation 2, calculation was performed using the diameter of the $TiO_2$ scattering particles set to 1.0 μm and the volume concentration thereof set to 0.5 vol %. The vertical axis represents beam divergence angle (degree) (divergence angle of emission light), and the horizontal axis represents angle which can emission (degree) (critical angle, which is an angle at which light can be emitted).

The contents of optical simulation 2 will be described in detail below.

(Purpose)

The degree of influence of an emission critical angle of the dielectric multilayer film (emission angle selection layer) on an emission divergence angle was checked.

(Method of Calculation)

An incident angle on the dielectric multilayer film from the phosphor layer side is denoted by θ. A constraint was set that fluorescence is emitted through the dielectric film only in a case of being incident on the dielectric film from the phosphor layer side at an angle smaller than θ. The divergence angles when θ was changed to 20, 30, and 40 degrees were calculated.

(Result)

It was confirmed that the fluorescence divergence angle was smallest when θ was 20 degrees. By reducing the critical angle of the dielectric multilayer film from 40 degrees to 20 degrees, the beam divergence angle could be reduced from 74 degrees to 12 degrees. Note that on the basis of the result of optical simulation 2, it is considered that the directivity is further increased in a region where the critical angle is smaller than 20 degrees.

3. Second Embodiment (Example 2 of Light-Emitting Element)

A light-emitting element of a second embodiment. (example 2 of light-emitting element) according to the present technology is a light-emitting element which includes at least a phosphor layer, an emission angle selection layer which emits light incident at a predetermined angle, a reflective layer, and a dielectric spacer, in which the phosphor layer includes a phosphor and a light scatterer, and the reflective layer, the dielectric spacer, the phosphor layer, and the light emission angle selection layer are arranged in this order.

In the light-emitting element of the second embodiment according to the present technology, the dielectric spacer may have any dielectric constant and thickness in any wavelength range, but preferably has a dielectric constant of 2.5 to 6.0 and has a thickness of 10 nm to 400 nm in a region with a wavelength of 380 nm to 780 nm.

According to the light-emitting element of the second embodiment according to the present technology, etendue can be reduced. Furthermore, as described later, in a case where a low reabsorption phosphor is used for the phosphor layer, the light-emitting element of the second embodiment according to the present technology can be further improved in emission decay.

Figure 4:
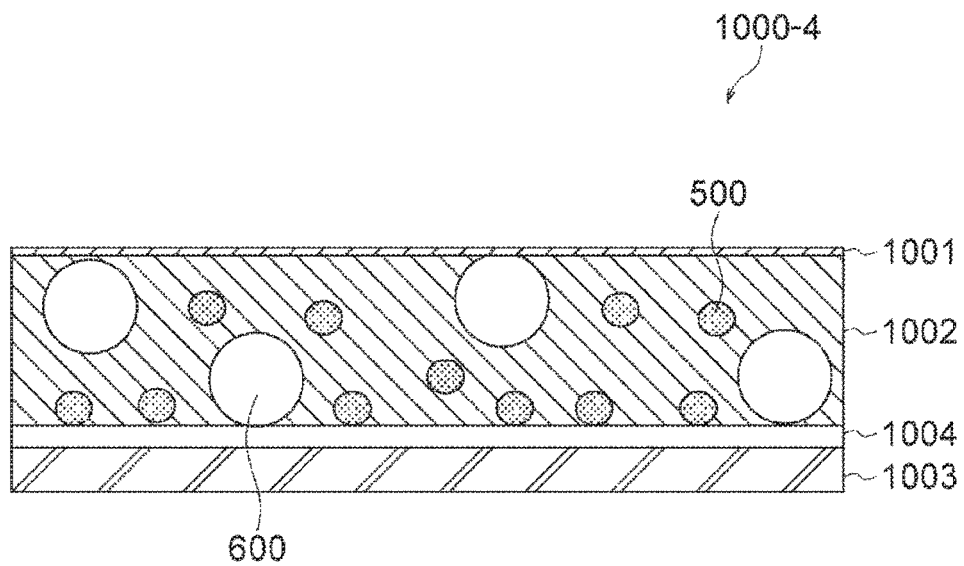
FIG. 4 is a cross-sectional view illustrating an example configuration of a light-emitting element of a second embodiment to which the present technology is applied.

FIG. 4 illustrates a light-emitting element 1000 (which is a light-emitting element 1000-4 in FIG. 4) as an example of the light-emitting element of the second embodiment according to the present technology. FIG. 4 is a cross-sectional view of the light-emitting element. 1000-4.

The light-emitting element 1000-4 includes the phosphor layer 1002, the emission angle selection layer 1001, the dielectric spacer 1004, and the reflective layer 1003, and the reflective layer 1003, the dielectric spacer 1004, the phosphor layer 1002, and the emission angle selection layer 1001 are arranged in this order. A surface of the light-emitting element 1000-4 on a side of incident light (though not illustrated in FIG. 4, excitation light) and emission light (though not illustrated in FIG. 4, fluorescence emission) serves as the emission angle selection layer 1001. The phosphor layer 1002 includes the phosphor 500 and the light scatterer 600.

As described above, the light-emitting element 1000-4 has a structure in which the dielectric spacer 1004 is arranged between the phosphor layer 1002 and the reflective layer (mirror substrate) 1003. In such a case, the mirror substrate 1003 uses a metal mirror, and surface plasmons are excited on a metal surface by excitation light or fluorescence. The excited surface plasmons can generate a strong electric field to excite the phosphor 500 and to enhance the amount of fluorescence emission. For example, from the viewpoint of the refractive index of transparent oxide, the dielectric spacer 1004 may be a material having a dielectric constant of 2.5 to 6.0 in a region with a wavelength of 380 nm to 780 nm. The thickness of the dielectric spacer 1004 may be in a range of 10 nm to 400 nm, for example, from the viewpoints of the dielectric constant of the dielectric spacer and the electric field penetration depth generated by the surface plasmons in an air medium. When employing the dielectric constant and the thickness designated as described above, the excitation efficiency of the phosphor by the surface plasmons is further improved.

Except for the content described above regarding the light-emitting element of the second embodiment according to the present technology, the content described in the column of the light-emitting element of the first embodiment according to the present technology can be applied as is to the light-emitting element of the second embodiment according to the present technology.

4. Third Embodiment (Example 3 of Light-Emitting Element)

A light-emitting element of a third embodiment (example 3 of light-emitting element) according to the present technology is a light-emitting element which includes at least a phosphor layer and an emission angle selection layer which emits light incident at a predetermined angle, in which the phosphor layer includes a phosphor, a light scatterer, and metal nanoparticles, the metal nanoparticles are arranged on a surface of the phosphor, and the phosphor layer and the light emission angle selection layer are arranged in this order.

The light-emitting element of the third embodiment according to the present technology may further include a reflective layer, and in such a case, the reflective layer, the phosphor layer, and the light emission angle selection layer are arranged in this order in the light-emitting element of the third embodiment according to the present technology. Furthermore, the light-emitting element of the third embodiment according to the present technology may further include a reflective layer and a dielectric spacer, and in such a case, the reflective layer, the dielectric spacer, the phosphor layer, and the light emission angle selection layer are arranged in this order.

When the light-emitting element of the third embodiment according to the present technology includes the dielectric spacer, the dielectric spacer may have any dielectric constant and thickness in any wavelength range, but preferably has a dielectric constant of 2.5 to 6.0 and has a thickness of 10 nm to 400 nm in a region with a wavelength of 380 nm to 780 nm.

According to the light-emitting element of the third embodiment according to the present technology, etendue can be reduced. Furthermore, as described later, in a case where a lows reabsorption phosphor is used for the phosphor layer, the light-emitting element of the third embodiment according to the present technology can be further improved in emission decay.

Figure 5:
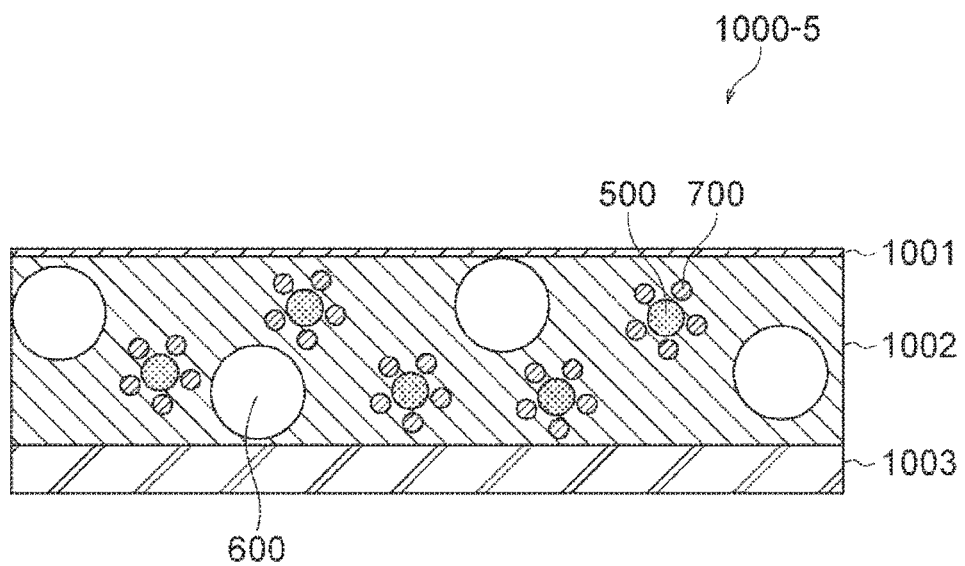
FIG. 5 is a cross-sectional view illustrating an example configuration of a light-emitting element of a third embodiment to which the present technology is applied.

FIG. 5 illustrates a light-emitting element 1000 (which is a light-emitting element 1000-5 in FIG. 5) as an example of the light-emitting element of the third embodiment according to the present technology. FIG. 5 is a cross-sectional view of the light-emitting element 1000-5.

The light-emitting element 1000-5 includes the phosphor layer 1002, the emission angle selection layer 1001, and the reflective layer 1003, and the reflective layer 1003, the phosphor layer 1002, and the emission angle selection layer 1001 are arranged in this order. A surface of the light-emitting element 1000-5 on a side of incident light (though not illustrated in FIG. 5, excitation light) and emission light (though not illustrated in FIG. 5, fluorescence emission) serves as the emission angle selection layer 1001. The phosphor layer 1002 includes the phosphor 500 and the light scatterer 600. As illustrated in FIG. 5, metal nanoparticles 700 are arranged on the surface of the phosphor 500.

As described above, the light-emitting element. 1000-5 has a structure in which the metal nanoparticles 700 are arranged on the surface of the phosphor 500. Surface plasmons are excited on the surfaces of the metal nanoparticles 700 by excitation light or fluorescence, and an electric field is localized. The phosphor can be excited not only by the excitation light but also by the localized strong electric field, and the amount of fluorescence emission can be enhanced. Since there is multiple reflection of light between the dielectric film (emission angle selection layer 1001) and the mirror (reflective layer 1003), plasmons can be efficiently excited. The metal nanoparticles may have any average particle diameter, but preferably have an average particle diameter of 200 nm or less, and may include at least one type of metal of Au, Ag or Ti as a constituent material. A distance between each of the metal nanoparticles 700 and the phosphor 500 is not particularly limited, but is preferably 20 nm or less.

Except for the content described above regarding the light-emitting element of the third embodiment according to the present technology, the content described in the column of the light-emitting element of the first embodiment according to the present technology can be applied as it is to the light-emitting element of the third embodiment according to the present technology.

5. Fourth Embodiment (Example 4 of Light-Emitting Element)

A light-emitting element of a fourth embodiment. (example 4 of light-emitting element) according to the present technology is a light-emitting element which includes at least a phosphor layer and an emission angle selection layer which emits light incident at a predetermined angle, in which the phosphor layer includes a phosphor and a light scatterer, the phosphor layer and the light emission angle selection layer are arranged in this order, and the emission angle selection layer has a grating structure.

The light-emitting element of the fourth embodiment according to the present technology may further include a reflective layer, and in such a case, the reflective layer, the phosphor layer, and the light emission angle selection layer are arranged in this order in the light-emitting element of the fourth embodiment according to the present technology. Furthermore, the light-emitting element of the fourth embodiment according to the present technology may further include the reflective layer and a dielectric spacer, and in such a case, the reflective layer, the dielectric spacer, the phosphor layer, and the light emission angle selection layer are arranged in this order.

When the light-emitting element of the fourth embodiment according to the present technology includes the dielectric spacer, the dielectric spacer may have any dielectric constant and thickness in any wavelength range, but preferably has a dielectric constant of 2.5 to 6.0 and has a thickness of 10 nm to 400 nm in a region with a wavelength of 380 nm to 780 nm.

According to the light-emitting element of the fourth embodiment according to the present technology, etendue can be reduced. Furthermore, as described later, in a case where a low reabsorption phosphor is used for the phosphor layer, the light-emitting element of the fourth embodiment according to the present technology can be further improved in emission decay.

Figure 6:
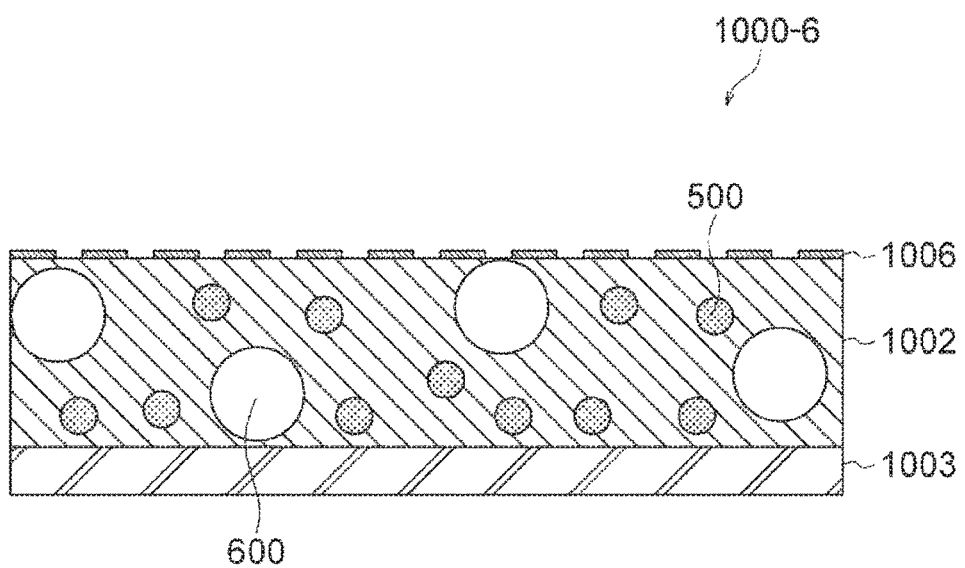
FIG. 6 is a cross-sectional view illustrating an example configuration of a light-emitting element of a fourth embodiment to which the present technology is applied.
Figure 7:
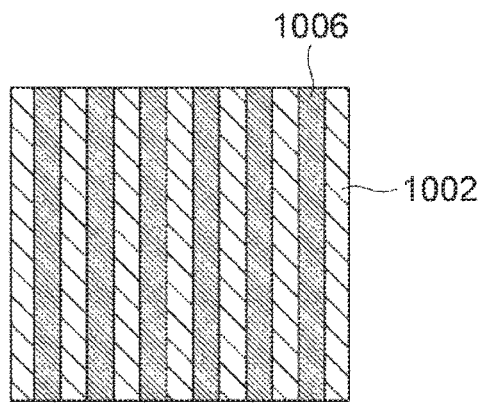
FIG. 7 is a plan view of the light-emitting element of the fourth embodiment to which the present technology is applied, viewed from above.

FIG. 6 illustrates a light-emitting element 1000 (which is a light-emitting element 1000-6 in FIG. 6) as an example of the light-emitting element of the fourth embodiment according to the present technology. FIG. 6 is a cross-sectional view of the light-emitting element 1000-6. Furthermore, FIG. 7 is a plan view of the light-emitting element 1000-6 viewed from above.

The light-emitting element 1000-6 includes the phosphor layer 1002, an emission angle selection layer 1006, and the reflective layer 1003, and the reflective layer 1003, the phosphor layer 1002, and the emission angle selection layer 1006 are arranged in this order. A surface of the light-emitting element 1000-6 on a side of incident light (though not illustrated in FIG. 6, excitation light) and emission light (though not illustrated in FIG. 6, fluorescent emission) serves as the emission angle selection layer 1006. The phosphor layer 1002 includes a phosphor 500 and a light scatterer 600. As illustrated in FIG. 6, the emission angle selection layer 1006 has a grating structure.

The grating structure will be described in more detail with reference to FIG. 7. Referring to FIG. 7, the emission angle selection layer 1006 linearly extends in the vertical direction of the light-emitting element 1000-6 (top-bottom direction in FIG. 7), and in the horizontal direction of the light-emitting element 1000-6 (left-right direction in FIG. 7), the emission angle selection layer 1006 and the phosphor layer 1002 form a substantially regular pitch.

The emission angle selection layer 1006 having a grating structure is arranged on a surface of the phosphor layer 1002. The directivity can be improved by controlling a diffraction wavelength and a diffraction direction by a material of grating and the pitch. A constituent material of the emission angle selection layer 1006 having a grating (diffraction grating) is not particularly limited, but is preferably a material having a transmittance of 80% or more in a region with a wavelength of 380 to 780 nm.

Except for the content described above regarding the light-emitting element of the fourth embodiment according to the present technology, the content described in the column of the light-emitting element of the first embodiment according to the present technology can be applied as it is to the light-emitting element of the fourth embodiment according to the present technology.

6. Fifth Embodiment (Example 5 of Light-Emitting Element)

A light-emitting element of a fifth embodiment (example 5 of light-emitting element) according to the present technology is a light-emitting element which includes at least a phosphor layer and an emission angle selection layer which emits light incident at a predetermined angle, in which the phosphor layer includes a phosphor and a light scatterer, the phosphor layer and the light emission angle selection layer are arranged in this order, and the emission angle selection layer has a patch structure.

The light-emitting element of the fifth embodiment according to the present technology may further include a reflective layer, and in such a case, the reflective layer, the phosphor layer, and the light emission angle selection layer are arranged in this order in the light-emitting element of the fifth embodiment according to the present technology. Furthermore, the light-emitting element of the fifth embodiment according to the present technology may further include the reflective layer and a dielectric spacer, and in such a case, the reflective layer, the dielectric spacer, the phosphor layer, and the light emission angle selection layer are arranged in this order.

When the light-emitting element of the fifth embodiment according to the present technology includes the dielectric spacer, the dielectric spacer may have any dielectric constant and thickness in any wavelength range, but preferably has a dielectric constant of 2.5 to 6.0 and has a thickness of 10 nm to 400 nm in a region with a wavelength of 380 nm to 780 nm.

According to the light-emitting element of the fifth embodiment according to the present technology, etendue can be reduced. Furthermore, as described later, in a case where a low reabsorption phosphor is used for the phosphor layer, the light-emitting element of the fifth embodiment according to the present technology can be further improved in emission decay.

Figure 8:
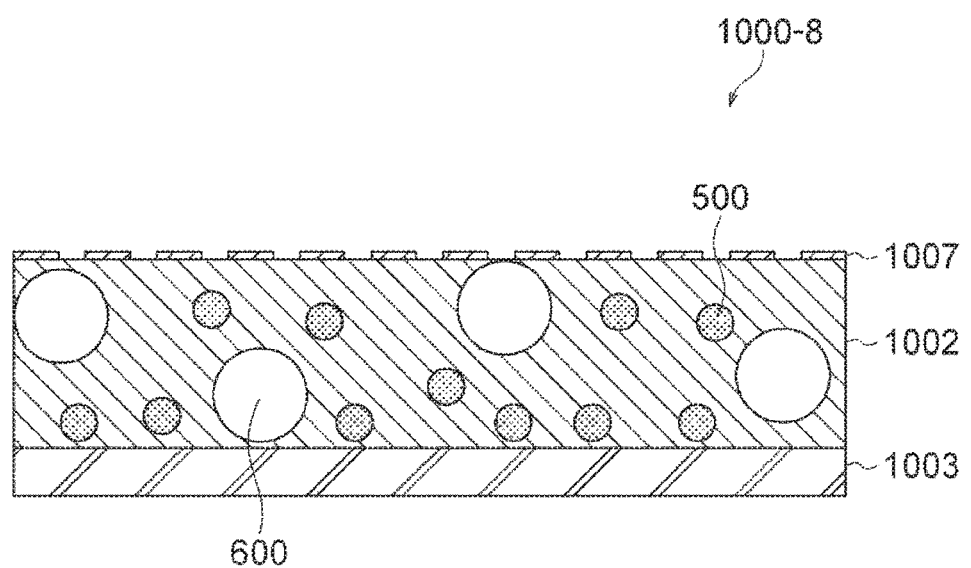
FIG. 8 is a cross-sectional view illustrating an example configuration of a light-emitting element of a fifth embodiment to which the present technology is applied.

FIG. 8 illustrates a light-emitting element 1000 (which is a light-emitting element 1000-8 in FIG. 8) as an example of the light-emitting element of the fifth embodiment according to the present technology. FIG. 8 is a cross-sectional view of the light-emitting element 1000-8. Furthermore, FIG. 8 is a plan view of the light-emitting element 1000-8 viewed from above.

The light-emitting element 1000-8 includes the phosphor layer 1002, an emission angle selection layer 1007, and the reflective layer 1003, and the reflective layer 1003, the phosphor layer 1002, and the emission angle selection layer 1007 are arranged in this order. A surface of the light-emitting element 1000-8 on a side of incident light (though not illustrated in FIG. 8, excitation light) and emission light (though not illustrated in FIG. 8, fluorescence emission) serves as the emission angle selection layer 1007. The phosphor layer 1002 includes a phosphor 500 and a light scatterer 600. As illustrated in FIG. 8, the emission angle selection layer 1007 has a patch structure.

Figure 9:
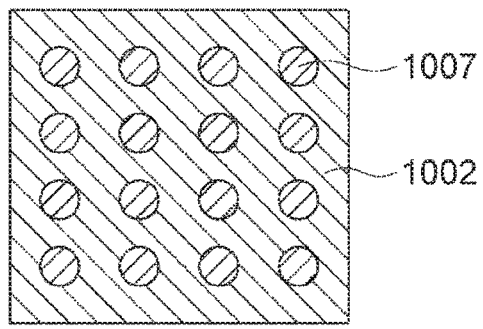
FIG. 9 is a plan view of the light-emitting element of the fifth embodiment to which the present technology is applied, viewed from above.

The patch structure will be described in more detail with reference to FIG. 9. Referring to FIG. 9, the emission angle selection layer 1007 is formed on the surface of the phosphor layer 1002 as substantially circular patches at substantially regular intervals in the vertical and horizontal directions (top-bottom direction and left-right direction in FIG. 9). The substantially circular patches may have a moth-eye structure.

Since the emission angle selection layer 1007 included in the light-emitting element 1000-8 has a patch structure (for example, a circular patch structure), it is possible to improve the directivity in planes perpendicular to the phosphor layer in all directions.

Except for the content described above regarding the light-emitting element of the fifth embodiment according to the present technology, the content described in the column of the light-emitting element of the first embodiment according to the present technology can be applied as it is to the light-emitting element of the fifth embodiment according to the present technology.

7. Sixth Embodiment (Example 6 of Light-Emitting Element)

A light-emitting element of a sixth embodiment (example 6 of light-emitting element) according to the present technology is a light-emitting element which includes at least a phosphor layer and an emission angle selection layer which emits light incident at a predetermined angle, in which the phosphor layer includes a phosphor and a light scatterer, the phosphor layer and the light emission angle selection layer are arranged in this order, and the light scatterer is a light-scattering reflector.

The light-emitting element of the sixth embodiment according to the present technology may further include a reflective layer, and in such a case, the reflective layer, the phosphor layer, and the light emission angle selection layer are arranged in this order in the light-emitting element of the sixth embodiment according to the present technology. Furthermore, the light-emitting element of the sixth embodiment according to the present technology may further include the reflective layer and a dielectric spacer, and in such a case, the reflective layer, the dielectric spacer, the phosphor layer, and the light emission angle selection layer are arranged in this order.

When the lights-emitting element of the sixth embodiment according to the present technology includes the dielectric spacer, the dielectric spacer may have any dielectric constant and thickness in any wavelength range, but preferably has a dielectric constant of 2.5 to 6.0 and has a thickness of 10 nm to 400 nm in a region with a wavelength of 380 nm to 780 nm.

According to the light-emitting element of the sixth embodiment according to the present technology, etendue can be reduced. Furthermore, as described later, in a case where a low reabsorption phosphor is used for the phosphor layer, the light-emitting element of the sixth embodiment according to the present technology can be further improved in emission decay.

Figure 10:
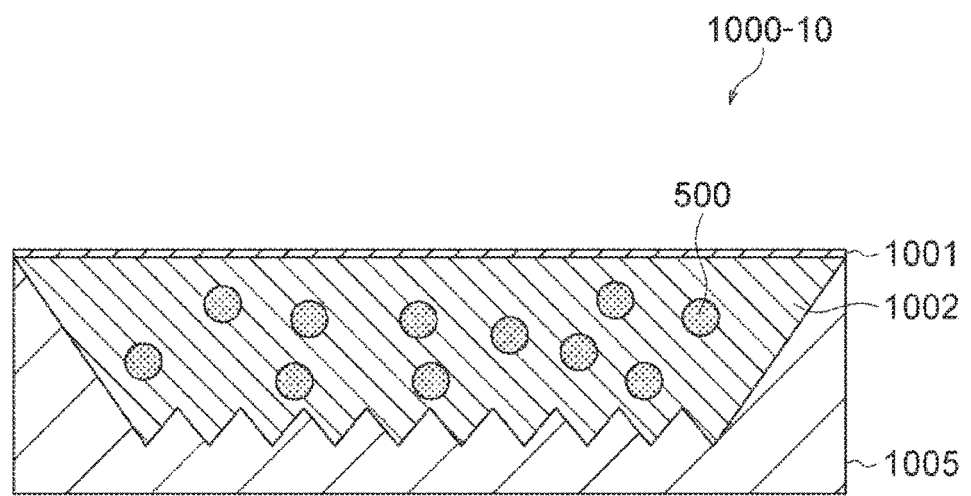
FIG. 10 is a cross-sectional view illustrating an example configuration of a light-omitting element of a sixth embodiment to which the present technology is applied.

FIG. 10 illustrates a light-emitting element 1000 (which is a light-emitting element 1000-10 in FIG. 10) as an example of the light-emitting element of the sixth embodiment according to the present technology. FIG. 10 is a cross-sectional view of the light-emitting element 1000-10.

The light-emitting element 1000-10 includes the phosphor layer 1002 and the emission angle selection layer 1001, and the phosphor layer 1002 and the emission angle selection layer 1001 are arranged in this order. A surface of the light-emitting element 1000-10 on a side of incident light (though not illustrated in FIG. 10, excitation light) and emission light (though not illustrated in FIG. 10, fluorescence emission) serves as the emission angle selection layer 1001. The phosphor layer 1002 includes the phosphor 500 and a light-scattering reflector 1005 which is a light scatterer. In FIG. 10, the light-scattering reflector 1005 is arranged from one side surface portion of the phosphor layer 1002 (for example, a left side surface portion of the phosphor layer 1002 in FIG. 10) to the other side surface portion of the phosphor layer 1002 (for example, a right side surface portion of the phosphor layer 1002 in FIG. 10) via a bottom surface portion of the phosphor layer 1002 (a lower portion of the phosphor layer 1002 in FIG. 10).

In the light-emitting element 1000-10, a structure (light-scattering reflector 1005) to which a reflector having a high light-scattering property is applied is used as a scattering structure. A reflector structure of the light-scattering reflector 1005 on the bottom surface portion of the phosphor layer 1002 is formed by processing a fine structure periodically or aperiodically. The light-scattering reflector 1005 has an inclined structure on each inner wall surface of the phosphor layer 1002, and achieves an effect that a fluorescence emission region is difficult to spread. A constituent material of the light-scattering reflector 1005 is not particularly limited, but is preferably a solid material having a reflectance of 80% or more in a region with a wavelength of 380 to 780 nm.

Except for the content described above regarding the light-emitting element of the sixth embodiment according to the present technology, the content described in the column of the light-emitting element of the first embodiment according to the present technology can be applied as it is to the light-emitting element of the sixth embodiment according to the present technology.

8. Seventh Embodiment (Example of Light Source Device)

A light source device of a seventh embodiment (example of light source device) according to the present technology is a light source device which includes a light-emitting element of at least one of the first to sixth embodiments according to the present technology, a light source which emits excitation light, and a moving mechanism which moves a position of the light-emitting element irradiated with the excitation light over time.

Figure 13:
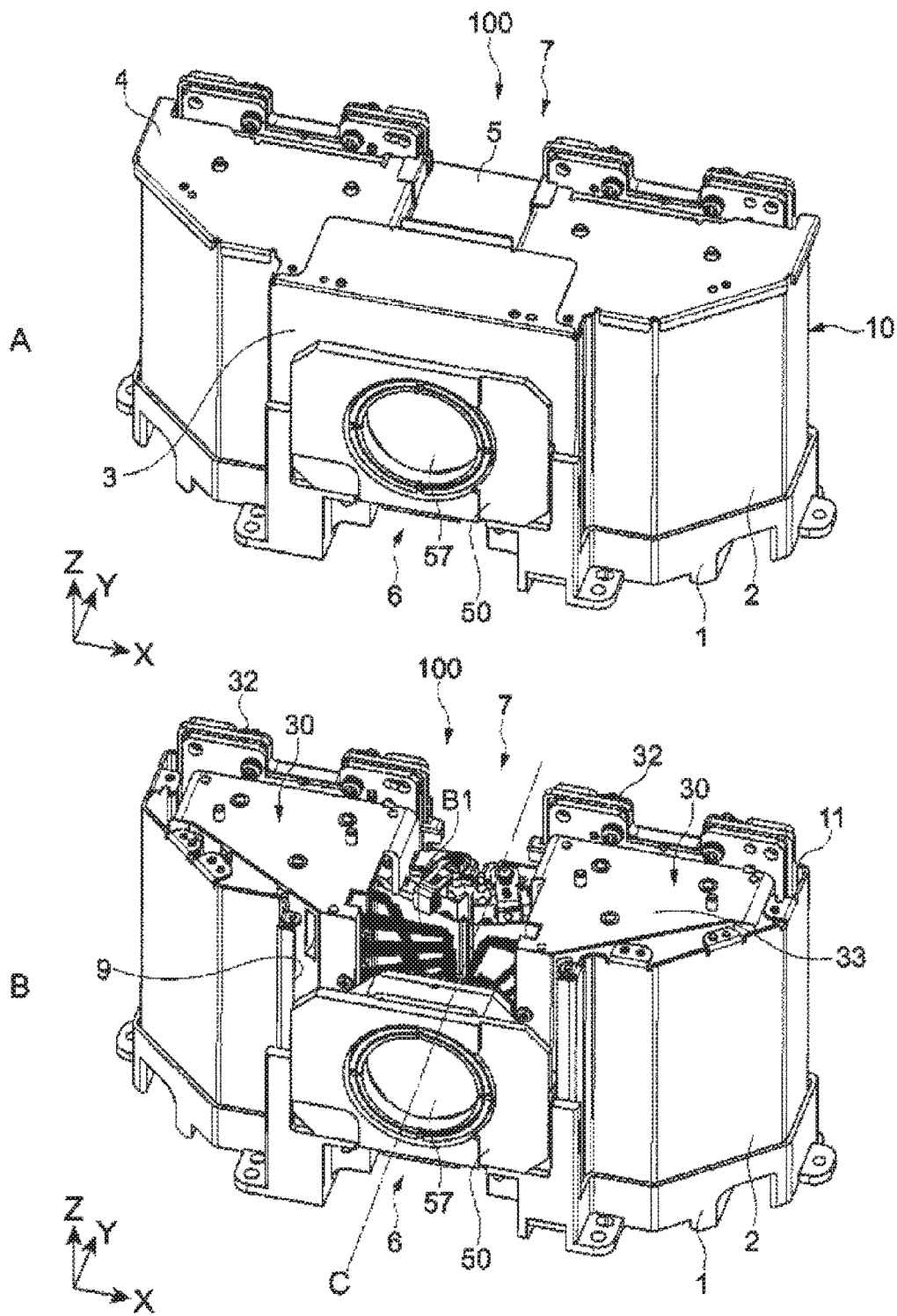
FIG. 13 is a set of perspective views illustrating an example configuration of a light source device of a seventh embodiment to which the present technology is applied.

FIG. 13 is a set of perspective views illustrating an example configuration of the light source device of the seventh embodiment according to the present technology. This light source device 100 is a light source device for a projector, and emits white light obtained by combining a laser beam in a blue wavelength region, and light in a red wavelength region to a green wavelength region generated from a fluorescent substance excited by the laser beam.

As illustrated in FIG. 13A, the light source device 100 includes a base 1 provided on a bottom portion and side wall portions 2 fixed to the base 1. Furthermore, the light source device 100 includes a front surface portion 3 and upper surface portions 4 connected to the side wall portions 2, and a lid portion 5 connected to the upper surface portions 4. The side wall portions 2, the front surface portion 3, the upper surface portions 4, and the lid portion 5 constitute a housing portion 10 of the light source device 100.

The base 1 has a shape elongated in one direction. A longitudinal direction in which the base 1 extends is a left-right direction of the light source device 100, and a transverse direction orthogonal to the longitudinal direction is a front-back direction thereof. Accordingly, one of two longitudinal portions facing each other in the transverse direction is a front side 6 and the other thereof is a rear side 7. Furthermore, a direction orthogonal to both the longitudinal direction and the transverse direction is a height direction of the light source device 100. In the example illustrated in FIG. 13, x-axis, y-axis, and z-axis directions are the left-right direction, the front-back direction, and the height direction, respectively.

FIG. 13B is a view in which the illustration of the front surface portion 3, the upper surface portions 4, and the lid portion 5 is omitted, and is a view illustrating an example of an internal configuration of the light source device 100. As illustrated in FIG. 13B, in each of the side wall portions 2, a notch 9 is formed in the center of the front side 6, and furthermore, an opening 11 is formed in the rear side 7. A fluorescence optical unit 50 is arranged in the notches 9 on the front side 6 of the side wall portions 2. The fluorescence optical unit 50 is fixed to the base 1 via the notches 9 so that a light emission side thereof faces the front side. Accordingly, an optical axis C of light emitted from the fluorescence optical unit 50 extends along a direction parallel to a y axis through the substantial center of the base 1 in plan view (see FIG. 14). Note that the fluorescence optical unit 50 includes the light-emitting element of at least one of the first to sixth embodiments according to the present technology.

Two condensing units 30 are arranged on the rear side 7 of the fluorescence optical unit 50. The condensing units 30 are arranged symmetrically with respect to the optical axis C. Each condensing unit 30 includes, for example, a laser light source 31 which emits a laser beam as a light source which emits excitation light in a first wavelength region. The number of laser light sources 31 provided is, for example, more than one.

Figure 14:
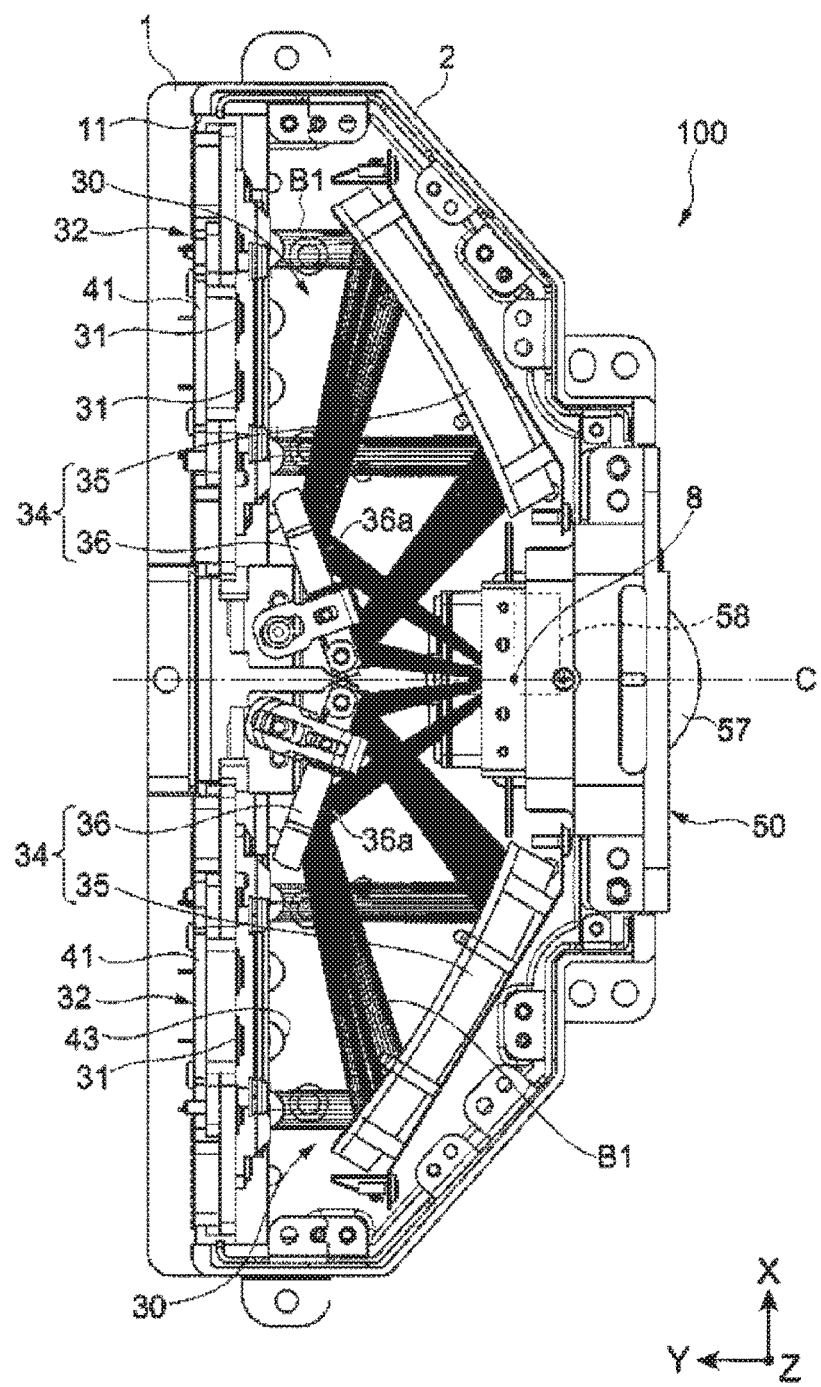
FIG. 14 is a plan view of the light source device of the seventh embodiment to which the present technology is applied, viewed from above.

FIG. 14 is a plan view of the light source device 100 illustrated in FIG. 13B viewed from above.

The condensing units 30 each include a light source unit 32 which includes the multiple laser light sources 31, and a condensing optical system 34 which condenses each of laser beams B1 emitted from the multiple laser light sources 31 to a predetermined condensing area (or condensing point) 8. Furthermore, the condensing units 30 each include a main frame 33 (see FIG. 13B) which supports the light source unit 32 and the condensing optical system 34 as one unit.

As illustrated in FIG. 13B, the two light source units 32 are arranged in the openings 11 on the rear side 7 of the side wall portions 2 so as to be aligned in the longitudinal direction. Each condensing unit 30 condenses the laser beams from the multiple laser light sources 31 to the fluorescence optical unit 50.

The multiple laser light sources 31 are, for example, blue laser light sources capable of oscillating a blue laser beam B1 having a peak wavelength of emission intensity in a region with a wavelength of equal to or greater than 400 nm and equal to or less than 500 nm as the first wavelength region. As the laser light source 31, not a light source which emits a laser beam, but another solid-state light source such as an LED may be used.

As illustrated in FIG. 13A, the upper surface portions 4 are arranged above the two condensing units 30. The upper surface portions 4 are connected to the side wall portions 2 and the two condensing units 30. The front surface portion 3 is connected to the fluorescence optical unit 50, the upper surface portions 4, and the base 1. The lid portion 5 is arranged so as to cover a region between the two condensing units 30, and is connected to the upper surface portions 4.

A method for fixing and connecting members to each other is not limited. For example, the members are engaged with each other via a predetermined engaging portion, and the members are fixed and connected to each other by screwing or the like.

As illustrated in FIG. 14, the condensing optical system. 34 described above includes an aspheric mirror 35 and a plane mirror 36. The aspheric mirror 35 reflects emission light from the multiple laser light sources 31 and condenses the emission light to the plane mirror 36. The plane mirror 36 reflects the reflected emission light so that the emission light reflected by the aspheric mirror 35 is condensed to the predetermined condensing area 8 as described above. As described later, the condensing area 8 is arranged on a phosphor layer 53 of a phosphor unit included in the fluorescence optical unit 50.

Note that the main frame 33 described above supports the light source unit 32, the aspheric mirror 35, and the plane mirror 36 as one unit.

The fluorescence optical unit 50 may include a phosphor unit and a fluorescent light collimator lens.

The phosphor unit may include, for example, a transparent substrate which is a disk-shaped rotating plate, a motor as a drive unit which rotates the transparent substrate, and the light-emitting element of at least one of the first to sixth embodiments according to the present technology, the light-emitting element being provided on one surface side of the transparent substrate, for example. The transparent substrate may function as a support which supports the light-emitting element. The motor and the transparent substrate function as a moving mechanism which moves the light-emitting element over time. By the moving mechanism, the position of the light-emitting element irradiated with the excitation light is moved over time, so that unexcited phosphor atoms are sequentially arranged at the position irradiated with the excitation light, which makes it possible for the light-emitting element to efficiently emit light.

9. Eighth Embodiment (Example of Projector)

A projector of an eighth embodiment (example of projector) according to the present technology is a projector which includes the light source device of the seventh embodiment, according to the present technology, an image generation unit which generates an image using light emitted from the light source device, and a projection unit which projects an image generated by the image generation unit.

Figure 15:
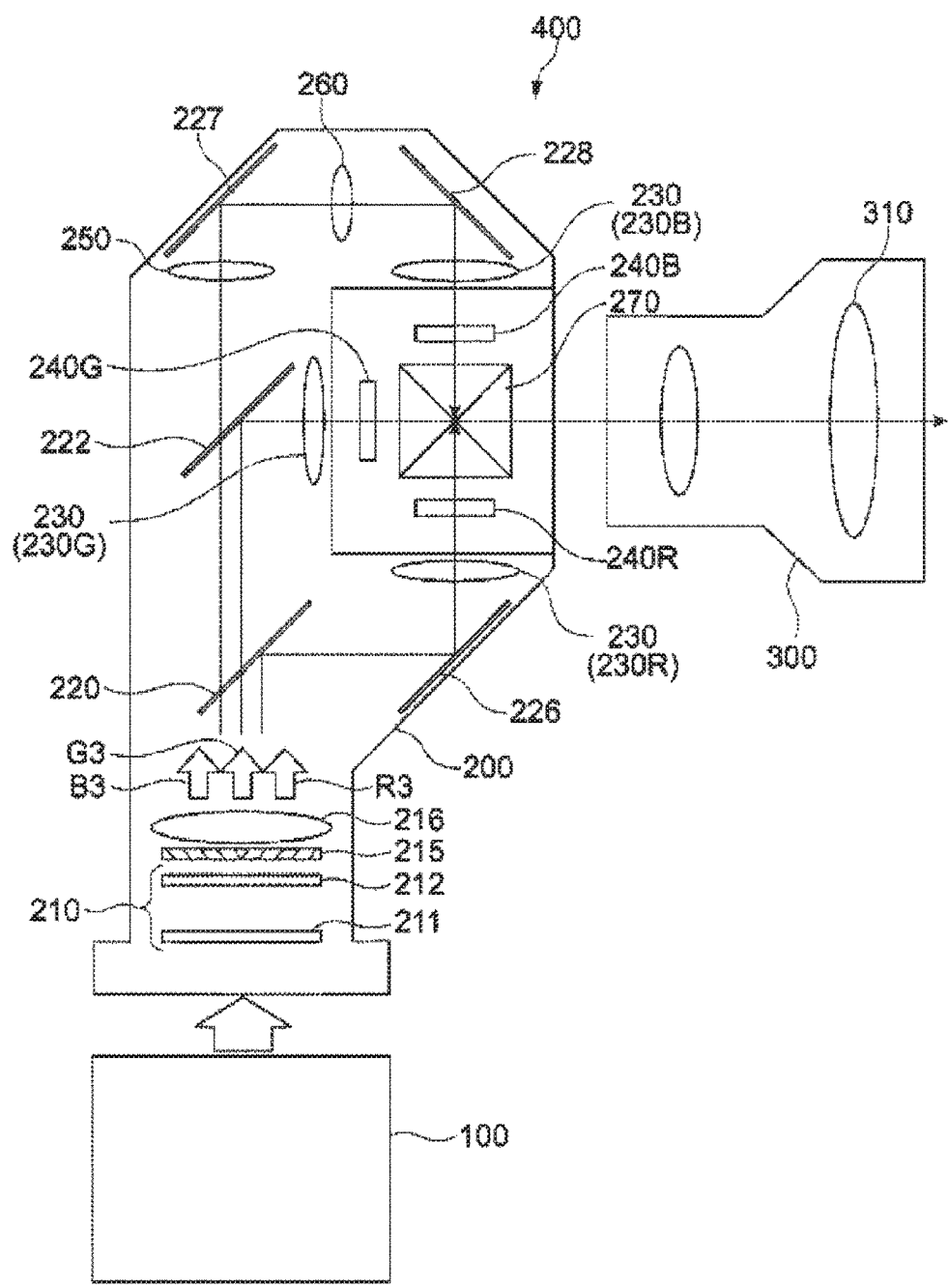
FIG. 15 is a schematic diagram illustrating an example configuration of a projector of an eighth embodiment to which the present technology is applied.

FIG. 15 is a schematic diagram illustrating an example configuration of the projector of the eighth embodiment according to the present technology.

A projector 400 includes the light source device 100, an image generation unit 200 which generates an image using light emitted from the light source device 100, and a projection unit 300 which projects image light generated by the image generation unit 200.

The image generation unit 200 includes an integrator element 210, a polarization conversion element 215, a condenser lens 216, dichroic mirrors 220 and 222, mirrors 226, 227 and 228, and relay lenses 250 and 260. Furthermore, the image generation unit 200 includes field lenses 230 230G, and 230B), liquid crystal light valves 240R, 240G, and 240B, and a dichroic prism 270.

The integrator element 210 has a function of adjusting incident light with which the light source device 100 performs irradiation of the liquid crystal light valves 240R, 2406, and 240B to be in a uniform luminance distribution as a whole. For example, the integrator element 210 includes a first fly-eye lens 211 including multiple microlenses (not illustrated) two-dimensionally arrayed, and a second fly-eye lens 212 including multiple microlenses arrayed in a one-to-one correspondence with the microlenses included in the first fly-eye lens 211.

A parallel light beam incident on the integrator element 210 from the light source device 100 is divided into multiple light fluxes by the microlenses of the first fly-eye lens 211, and each of the multiple light fluxes forms an image on a corresponding microlens of the second fly-eye lens 212. Each of the microlenses of the second fly-eye lens 212 functions as a secondary ht source, and irradiates the polarization conversion element 215 with multiple parallel light beams as incident light.

The polarization conversion element 215 has a function of aligning a polarization state of incident light incident via the integrator element 210 or the like. The polarization conversion element 215 emits emission light including blue light B3, green light G3, and red light R3, for example, via the condenser lens 216 or the like arranged on a portion facing a light emission side of the light source device 100.

The dichroic mirrors 220 and 222 have a property of selectively reflecting color light in a predetermined wavelength region and transmitting light in other wavelength regions. For example, the dichroic mirror 220 selectively reflects the red light R3. The dichroic mirror 222 selectively reflects the green light G3 between the green light G3 and the blue light B3 which have been transmitted through the dichroic mirror 220. The remaining blue light B3 is transmitted through the dichroic mirror 222. Therefore, the light emitted from the light source device 100 is separated into multiple types of light having colors different from each other.

The separated red light R3 is reflected by the mirror 226, collimated by passing through the field lens 230R, and then is incident on the liquid crystal light valve 240R for modulating red light. The green light G3 is collimated by passing through the field lens 230G, and then is incident on the liquid crystal light valve 240G for modulating green light. The blue light B3 passes through the relay lens 250, is reflected by the mirror 227, further passes through the relay lens 260, and is reflected by the mirror 228. The blue light B3 reflected by the mirror 228 is collimated by passing through the field lens 230B, and then is incident on the liquid crystal light valve 240B for modulating blue light.

The liquid crystal light valves 240R, 240G, and 240B are electrically connected to a signal source (for example, a PC or the like) (not illustrated) which supplies an image signal including image information. On the basis of supplied image signals of respective colors, the liquid crystal light valves 240R, 240G, and 240B modulate incident light on a pixel-by-pixel basis, and generate a red image, a green image, and a blue image, respectively. The respective types of modulated light having corresponding colors (formed images) are incident on the dichroic prism 270 to be combined. The dichroic prism 270 superimposes and combines the respective types of light having corresponding colors incident from three directions, and emits the combined light toward the projection unit 300.

The projection unit 300 includes a plurality of 310, and irradiates a screen (not illustrated) with the light combined by the dichroic prism 270. Therefore, a full-color image is displayed.

By appropriately setting the shape and the like of the light source device 100, it is possible to improve outer design and the like of the projector 400.

Note that the embodiment according to the present technology is not limited to the respective embodiments described above. Various modifications may be made without departing from the gist of the present technology.

Furthermore, the effects described herein are merely examples and are not limited, and there may be other effects than those described herein.

Furthermore, the present technology may also be configured as follows.

[1]

A light-emitting element including at least a phosphor layer and an emission angle selection layer that emits light incident at a predetermined angle, in which the phosphor layer includes a phosphor and a light scatterer, and the phosphor layer and the light emission angle selection layer are arranged in this order.

[2]

The light-emitting element according to [1], further including a reflective layer, in which the reflective layer, the phosphor layer, and the light emission angle selection layer are arranged in this order.

[3]

The light-emitting element according to [2], further including a dielectric spacer, in which the dielectric spacer is arranged between the reflective layer and the phosphor layer.

[4]

The light-emitting element according to [3], in which the dielectric spacer has a dielectric constant of 2.5 to 6.0 and has a thickness of 10 nm to 400 nm in a region with a wavelength of 380 nm to 780 nm.

[5]

The light-emitting element according to any one of [1] to [4], in which the phosphor layer further includes metal nanoparticles, and the metal nanoparticles are arranged on a surface of the phosphor.

[6]

The light-emitting element according to [5], further including a reflective layer, in which the reflective layer, the phosphor layer, and the light emission angle selection layer are arranged in this order.

[7]

The light-emitting element according to [6], further including a dielectric spacer, in which the dielectric spacer is arranged between the reflective layer and the phosphor layer.

[8]

The light-emitting element according to [7], in which the dielectric spacer has a dielectric constant of 2.5 to 6.0 and has a thickness of 10 nm to 400 nm in a region with a wavelength of 380 nm to 780 nm.

[9]

The light-emitting element according to any one of [1] to [8], in which the phosphor includes a low reabsorption phosphor.

[10]

The light-emitting element according to any one of [1] to [9], in which the emission angle selection layer includes a dielectric film.

[11]

The light-emitting element according to any one of [1] to [10], in which the emission angle selection layer has a grating structure.

[12]

The light-emitting element according to any one of [1] to [10], in which the emission angle selection layer has a patch structure.

[13]

The light-emitting element according to any one of [1] to [12], in which the light scatterer includes a light-scattering reflector.

[14]

The light-emitting element according to any one of [1] to [12], in which the light scatterer includes scattering particles.

[15]

The light-emitting element according to any one of [1] to [12], in which the light scatterer includes a void.

[16]

A light source device including: the light-emitting element according to any one of [1] to [15], a light source that emits excitation light, and a moving mechanism that moves a position of the light-emitting element irradiated with the excitation light over time.

[17]

A projector including:

the light source device according to [16];

an image generation unit that generates an image using light emitted from the light source device; and a projection unit that projects an image generated by the image generation unit.

REFERENCE SIGNS LIST

1000 (1000-1 to 1000-10) Light-emitting element.
1001, 1006, 1007 Emission angle selection layer
1002 Phosphor layer
1003 Reflective layer
1004 Dielectric spacer
1005 Light-scattering reflector (light scatterer)
500 Phosphor
600 Light scatterer
700 Metal nanoparticle

The invention claimed is:

1. A light-emitting element comprising at least:
a phosphor layer;
a dielectric spacer; and
an emission angle selection layer that emits light incident at a predetermined angle, wherein the phosphor layer includes a phosphor and a light scatterer, and wherein the dielectric spacer has a dielectric constant of 2.5 to 6.0 and has a thickness of 10 nm to 400 nm in a region with a wavelength of 380 nm to 780 nm.

2. The light-emitting element according to claim 1, further comprising a reflective layer,
wherein the reflective layer, the phosphor layer, and the light emission angle selection layer are arranged in this order.

3. The light-emitting element according to claim 2, wherein the dielectric spacer is arranged between the reflective layer and the phosphor layer.

4. The light-emitting element according to claim 1,
wherein the phosphor layer further includes metal nanoparticles, and wherein the metal nanoparticles are arranged on a surface of the phosphor.

5. The light-emitting element according to claim 4, further comprising a reflective layer, wherein the reflective layer, the phosphor layer, and the emission angle selection layer are arranged in this order.

6. The light-emitting element according to claim 5, wherein the dielectric spacer is arranged between the reflective layer and the phosphor layer.

7. The light-emitting element according to claim 1, wherein the phosphor includes a low reabsorption phosphor.

8. The light-emitting element according to claim 1, wherein the emission angle selection layer includes a dielectric film.

9. The light-emitting element according to claim 1, wherein the emission angle selection layer has a grating structure.

10. The light-emitting element according to claim 1, wherein the emission angle selection layer has a patch structure.

11. The light-emitting element according to claim 1, wherein the light scatterer includes a light-scattering reflector.

12. The light-emitting element according to claim 1, wherein the light scatterer includes scattering particles.

13. The light-emitting element according to claim 1, wherein the light scatterer includes a void.

14. A projector comprising:
a light-emitting element comprising:
a phosphor layer;
a dielectric spacer; and
an emission angle selection layer that emits light incident at a predetermined angle, wherein the phosphor layer includes a phosphor and a light scatterer, and wherein the dielectric spacer has a dielectric constant of 2.5 to 6.0 and has a thickness of 10 nm to 400 nm in a region with a wavelength of 380 nm to 780 nm;
a light source that emits excitation light;
an image generation unit that generates an image using light emitted from the light source device, and
a projection unit that projects an image generated by the image generation unit.

* * * * *